(12) United States Patent
Marur et al.

(10) Patent No.: US 9,821,753 B2
(45) Date of Patent: Nov. 21, 2017

(54) ENERGY ABSORBER ELEMENTS AND VEHICLE SYSTEMS

(71) Applicant: Sabic Global Technologies B.V., Bergen op Zoom (NL)

(72) Inventors: Sudhakar Ramamoorthy Marur, Bangalore (IN); Ankit Kumar Garg, Bangalore (IN); Subrata Nayak, Bangalore (IN); Triloka Chander Tankala, Chennal (IN); James Robert Wilson, Troy, MI (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 14/669,242

(22) Filed: Mar. 26, 2015

(65) Prior Publication Data
US 2015/0197214 A1    Jul. 16, 2015

Related U.S. Application Data

(63) Continuation of application No. 13/028,531, filed on Feb. 16, 2011, now Pat. No. 9,033,399.
(Continued)

(51) Int. Cl.
*B60R 21/00* (2006.01)
*B60R 21/34* (2011.01)
(Continued)

(52) U.S. Cl.
CPC .......... *B60R 21/34* (2013.01); *B60N 2/42709* (2013.01); *B60Q 1/0491* (2013.01);
(Continued)

(58) Field of Classification Search
CPC . B60R 21/34; B60R 2021/343; B60Q 1/0491; B60N 2/42709; B62D 1/11; F16B 1/00; F16F 7/121
(Continued)

(56) References Cited

U.S. PATENT DOCUMENTS

| 4,843,531 A | 6/1989 | Mochizuki et al. |
| 5,306,066 A * | 4/1994 | Saathoff ................. B60J 5/0451 188/377 |

(Continued)

FOREIGN PATENT DOCUMENTS

| DE | 2452337 A1 | 5/1976 |
| EP | 1457393 A1 | 9/2004 |

(Continued)

OTHER PUBLICATIONS

DE 2452337 A1 Published May 6, 1976; Applicant Porsche AG; Energy-end Part for Vehicles, Particularly Motor Vehicles; Machine Translation 15 pages.
(Continued)

*Primary Examiner* — Joseph D Pape
(74) *Attorney, Agent, or Firm* — Cantor Colburn LLP

(57) ABSTRACT

In some embodiments, an energy absorber element can comprise: a first support wall and a second support wall, a crush wall joining the first and second support walls together to define a deformable zone; a connection mechanism configured to connect the first and/or second support wall to a vehicle. In one embodiment, a method for using an energy absorber element in a vehicle can comprise: detachably connecting an energy absorber element to a vehicle at a support location for a vehicle component, once the energy absorber element has absorbed energy, detaching the energy absorber element from the vehicle; and separately replacing the energy absorber element from the vehicle component. In some embodiments, the vehicle component is not replaced.

18 Claims, 10 Drawing Sheets

Related U.S. Application Data

(60) Provisional application No. 61/309,189, filed on Mar. 1, 2010, provisional application No. 61/316,940, filed on Mar. 24, 2010.

(51) Int. Cl.
*B60N 2/427* (2006.01)
*B60Q 1/04* (2006.01)
*B60R 21/04* (2006.01)
*B62D 1/11* (2006.01)
*F16B 1/00* (2006.01)
*F16F 7/12* (2006.01)
*B60R 19/18* (2006.01)

(52) U.S. Cl.
CPC .......... *B60R 21/04* (2013.01); *B62D 1/11* (2013.01); *F16B 1/00* (2013.01); *F16F 7/121* (2013.01); *B60R 2019/186* (2013.01); *B60R 2021/343* (2013.01); *Y10T 29/4973* (2015.01); *Y10T 29/49826* (2015.01); *Y10T 29/49876* (2015.01)

(58) Field of Classification Search
USPC ........ 296/96.21, 192, 26.22, 187.03, 187.09, 296/187.11, 187.12, 187.04
See application file for complete search history.

(56) References Cited

U.S. PATENT DOCUMENTS

| | | | |
|---|---|---|---|
| 5,549,327 | A | 8/1996 | Rusche et al. |
| 6,190,030 | B1 | 2/2001 | Chase |
| 6,199,942 | B1 | 3/2001 | Carroll, III et al. |
| 6,227,582 | B1 | 5/2001 | Ichien |
| 6,478,456 | B1 | 11/2002 | Eichhorn et al. |
| 6,840,659 | B2 | 1/2005 | Frank et al. |
| 6,923,494 | B2 | 8/2005 | Shuler et al. |
| 6,994,384 | B2 | 2/2006 | Shuler et al. |
| 7,008,006 | B2* | 3/2006 | Steinhauser ........... B62D 21/10 296/181.2 |
| 7,029,154 | B2 | 4/2006 | Arlon et al. |
| 7,156,545 | B2 | 1/2007 | Arlon |
| 7,204,336 | B2 | 4/2007 | Arlon et al. |
| 7,204,545 | B2 | 4/2007 | Roux et al. |
| 7,325,642 | B2 | 2/2008 | Roux et al. |
| 7,329,032 | B2 | 2/2008 | Verwaerde et al. |
| 7,390,114 | B2 | 6/2008 | Konig et al. |
| 8,091,286 | B2 | 1/2012 | Totani et al. |
| 2003/0142503 | A1 | 7/2003 | Ericsson et al. |
| 2004/0012975 | A1 | 1/2004 | Chase et al. |
| 2004/0174025 | A1 | 9/2004 | Converse et al. |
| 2006/0049669 | A1* | 3/2006 | Yamamoto ................. B60J 1/20 296/201 |
| 2006/0072332 | A1 | 4/2006 | Arlon |
| 2006/0072333 | A1 | 4/2006 | Baert et al. |
| 2006/0146556 | A1 | 7/2006 | Arlon et al. |
| 2008/0036242 | A1 | 2/2008 | Glance et al. |
| 2008/0181722 | A1 | 7/2008 | McKenney et al. |
| 2008/0272611 | A1 | 11/2008 | Gidcumb |

FOREIGN PATENT DOCUMENTS

| | | |
|---|---|---|
| EP | 1619088 A1 | 1/2006 |
| EP | 1702794 A1 | 9/2006 |
| FR | 2915155 A1 | 10/2008 |
| GB | 1178504 | 1/1970 |
| JP | 11208519 A | 8/1999 |
| JP | 2000108840 A | 4/2000 |
| JP | 2000108841 A | 4/2000 |
| JP | 2002046651 A | 2/2002 |
| JP | 2004009802 A | 1/2004 |
| JP | 2005022597 A | 1/2005 |
| JP | 2007099148 | 4/2007 |
| WO | 9523299 A1 | 8/1995 |

OTHER PUBLICATIONS

European Patent No. 1457393 (A1); Date of Publication: Sep. 15, 2004; Abstract Only; 1 Page.
European Patent No. 1619088 (A1); Date of Publication: Jan. 25, 2006; Abstract Only; 1 Page.
European Patent No. 1702794 (A1); Date of Publication: Sep. 20, 2006; Abstract Only; 1 Page.
European Patent No. 1702794 (B1); Publication Date: Apr. 29, 2009; Abstract Only; 1 Page.
French Patent No. 2915155 (A1); Date of Publication: Oct. 24, 2008; Abstract Only; 1 Page.
German Patent No. 2452337 (A1); Date of Publication: May 6, 1976; Machine Translation; 15 Pages.
German Patent No. 2452337; Publication Date: May 6, 1976; Machine Translation; 10 Pages.
International Publication No. 9523299 (A1); Date of Publication; Aug. 31, 1995; Abstract Only; 1 Page.
International Search Report; International Application No. PCT/US2009/059670; International Filing Date Oct. 6, 2009; dated Dec. 16, 2009; 8 Pages.
International Search Report; International Application No. PCT/US2009/059670; International Publication Date Oct. 6, 2009; dated Dec. 16, 2009; 8 Pages.
International Search Report; International Application No. PCT/US2011/026624; International Filing Date Mar. 1, 2011; dated Jun. 6, 2011; 5 Pages.
Japanese Patent No. 11208519 (A); Date of Publication: Aug. 3, 1999; Abstract Only; 1 Page.
Japanese Patent No. 2000108840 (A); Date of Publication: Apr. 18, 2000; Abstract Only; 1 Page.
Japanese Patent No. 2000108841 (A); Date of Publication: Apr. 18, 2000; Abstract Only; 1 Page.
Japanese Patent No. 2002046651 (A); Date of Publication: Feb. 12, 2002; Abstract Only; 1 Page.
Japanese Patent No. 2004009802 (A); Date of Publication: Jan. 15, 2004; Abstract Only; 1 Page.
Written Opinion of the Internation Searching Authority; International Application No. PCT/US2009/059670; International Publication Date: Oct. 6, 2009; dated Dec. 16, 2009; 7 Pages.
Written Opinion of the International Searching Authority; International Application No. PCT/US2009/059670; International Filing Date: Oct. 6, 2009; dated Dec. 16, 2009; 7 Pages.
Written Opinion of the International Searching Authority; International Application No. PCT/US2011/026624; International Filing Date: Mar. 1, 2011; dated Jun. 7, 2011; 6 Pages.
Machine Translation of JP2007099148(A); Date of Publication: Apr. 19, 2007; 16 Pages.
Japanese Patent No. 2005022597(A); Date of Publication: Jan. 27, 2005; Machine Translation; 11 Pages.

* cited by examiner

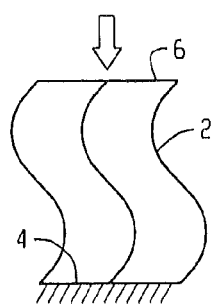
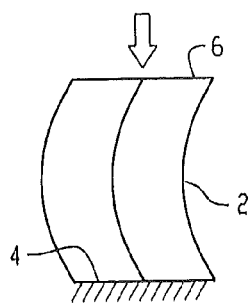
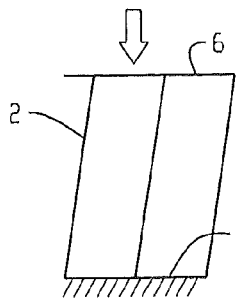
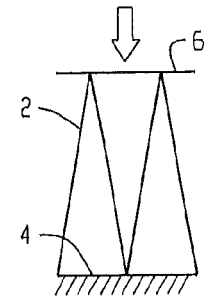
Fig. 1    Fig. 2    Fig. 3    Fig. 4
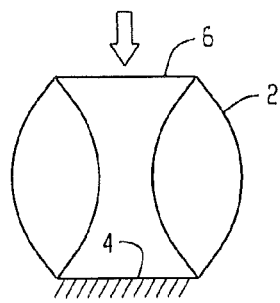
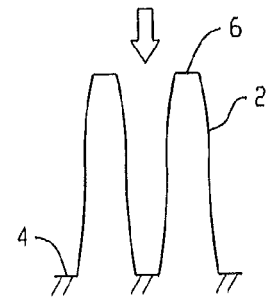
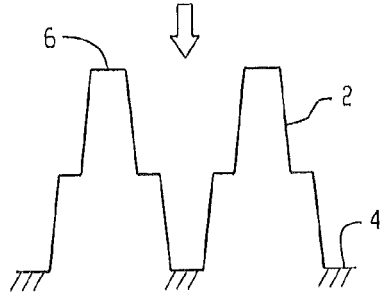
Fig. 5    Fig. 6    Fig. 7
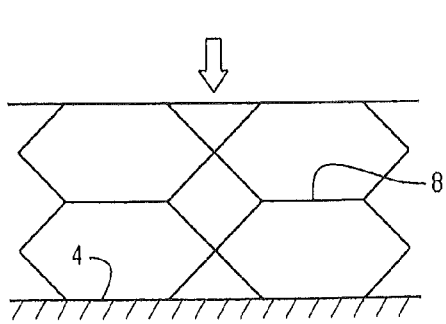
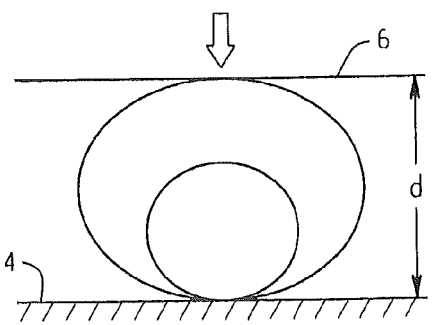
Fig. 8    Fig. 9

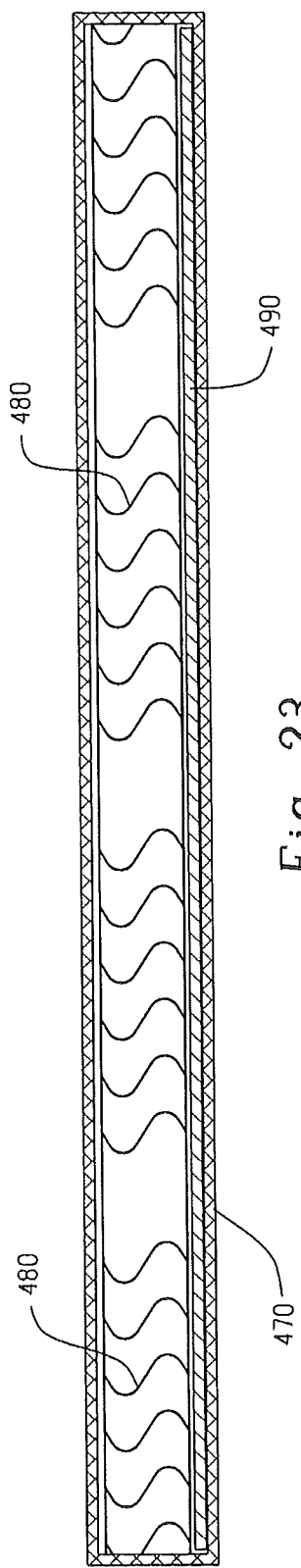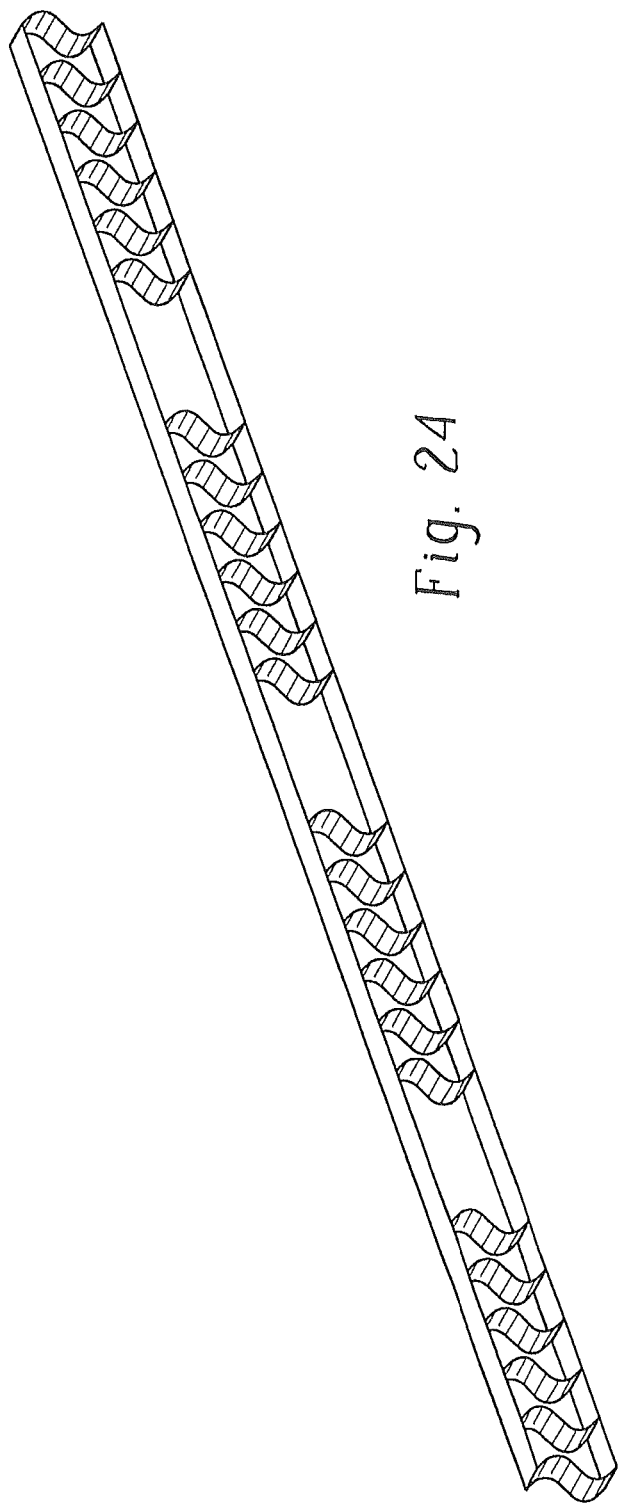

ENERGY ABSORBER ELEMENTS AND VEHICLE SYSTEMS

CROSS-REFERENCE TO RELATED APPLICATIONS

This application is a continuation application of U.S. patent application Ser. No. 13/028,531, filed Feb. 16, 2011, which claims priority to Provisional Application Ser. No. 61/309,189 filed Mar. 1, 2010 and to U.S. Provisional Application Ser. No. 61/316,940 filed Mar. 24, 2010, all of which are incorporated herein by reference in their entirety.

BACKGROUND

The present disclosure relates generally to energy absorber elements for use in a vehicle, for example, to reduce injuries (e.g., to occupant(s), pedestrian(s), etc.) and/or vehicle damage.

Increased importance has been placed on methods for minimizing the amount of injury suffered by a person in an accident as well as the amount of vehicle damage. Different regulatory committees assess automotive pedestrian and occupant impact performance globally. Depending on the overall performance, vehicles get a cumulative safety rating. Each and every component of the vehicle needs to satisfy the specific impact criteria in order to ensure a good overall rating for the vehicle.

With respect to vehicle damage, for example, due to their placement at the front or the corners of the vehicle, the headlamps of the vehicle are one of the locations most contacted by a pedestrian in an impact, or damaged in an impact with another vehicle. Several different designs have been proposed for minimizing pedestrian injury during an impact as well as damage to headlamps or headlights. Some of them require significant structural modifications to the headlamp which increase its volume, weight, and/or cost. Others require structural modification to the chassis surrounding the headlamp area. Generally, headlamps are provided in a single assembly comprising a lens, a housing, a light source, a bezel, and a reflector. If there is even very limited damage to any component of the headlamp assembly, the entire assembly may have to be replaced. This results in a high replacement or maintenance cost.

This generates the need to design a uniform energy absorption concept that will deform and absorb impact energy to ensure good vehicle safety rating. Different components due to their inherent geometry and assembly requirements need different energy absorber design to satisfy the impact criteria. Therefore, the automotive industry is continually seeking economic solutions to improve overall safety rating of a vehicle. Hence, there is a continual need to provide a solution which would enhance a vehicle safety rating and/or reduce vehicle damage.

There is also a need to reduce replacement and maintenance costs, particularly costs associated with low impact energy incidents. A product and/or method that reduces or eliminates damage to an impacted vehicle component and thereby reduces the need to replace that component is desired.

BRIEF DESCRIPTION

Disclosed, in various embodiments, are energy absorber elements which can be used in conjunction with various vehicle components.

In one embodiment, an energy absorber element can comprise: a first support wall and a second support wall, a crush wall joining the first and second support walls together to define a deformable zone; a connection mechanism configured to connect the first and/or second support wall to a vehicle.

In another embodiment, an energy absorber element can comprise: a crush wall defining a deformable zone; a first support wall and a second support wall, the first and second support walls connecting to the crush wall to form a structure; and a connection mechanism for connecting the structure to a vehicle.

In yet another embodiment, an energy absorber ring for a headlamp assembly can comprise: a first support wall defining a ring for surrounding the associated headlamp assembly; a crush wall extending from the first support wall to define a deformable zone; and connection mechanism configured to connect the ring to a vehicle.

In still another embodiment, the energy absorber element for a headlamp assembly can comprise: a first support wall and a second support wall, each support wall containing an opening through which the headlamp assembly can be inserted; a plurality of crush walls joining the first and second support walls together to define a plurality of deformable zones and form a ring; and crushable connectors for connecting the ring to a vehicle.

In one embodiment, a method for absorbing impact energy in a vehicle can comprise: impacting a vehicle component with impact energy; and absorbing the impact energy with an energy absorber element that is detachably mounted to the vehicle.

In one embodiment, a method for using an energy absorber element with a vehicle component can comprise: detachably connecting an energy absorber element to a vehicle.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

FIGS. 1-9 are cross-sectional illustrations of exemplary designs for the crush walls of energy absorber elements.

FIG. 23 is a cross-sectional side view of an exemplary seat back comprising foam and energy absorber elements.

FIG. 24 is a perspective view of the energy absorber elements of FIG. 23.

DETAILED DESCRIPTION

Figure 10:
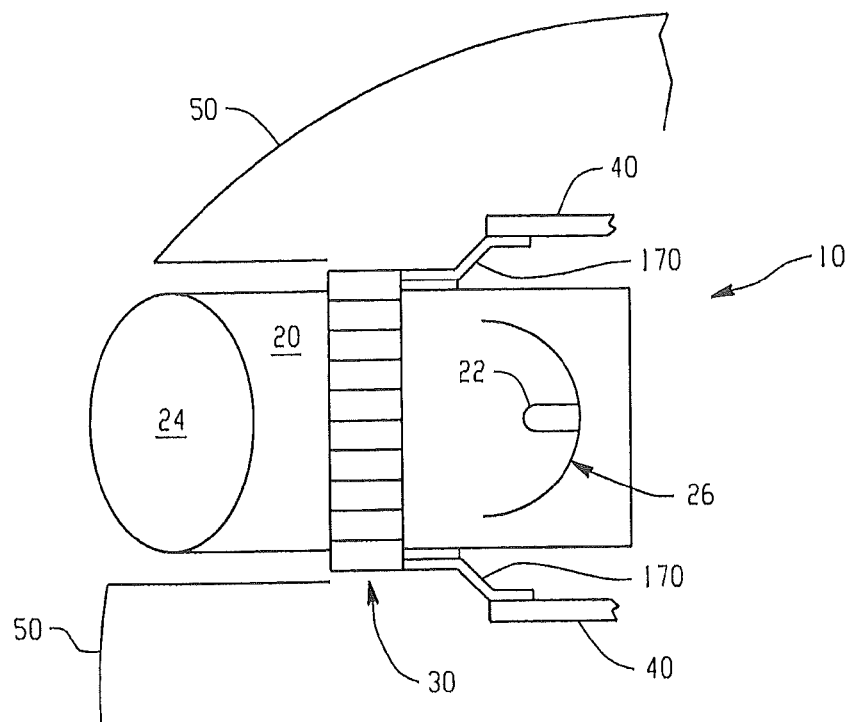
FIG. 10 is a side cross-sectional view of a headlamp assembly and an exemplary embodiment of an energy absorber element in the chassis of a motor vehicle.

Disclosed, in various embodiments, are energy absorber elements (e.g., strips, rings, etc.) which can be used in conjunction with vehicle components, e.g., to minimize the damage and/or injury suffered in an impact. For example so as to protect a vehicle component and/or to absorb energy when a particular vehicle component is impacted. The energy absorber element can be located, for example, between a vehicle component and a support (e.g., at the support location of a vehicle component (e.g., between the component and its support)), attached to the vehicle component and/or the support, and can optionally be demountable from the vehicle (e.g., removably attached; i.e., can be removed without damaging the element to which it is attached). Therefore, during an impact at the location of a particular vehicle component, the impact energy can be absorbed by the energy absorber element, thereby protecting the vehicle component, pedestrian, and/or occupant. Since the energy absorber element is separately demountable from the vehicle component, after the impact, the energy absorber element can be replaced. The vehicle component does not need to be replaced merely because the energy absorber element has absorbed energy (e.g., been crushed).

The energy absorber elements, which for example, can have an open or closed configuration, have a side oriented to be subjected to impact (such as an object impact (e.g., guard rail, parking barrier, etc.), pedestrian, and/or occupant impact (e.g., connected to a vehicle component that will receive a pedestrian and/or occupant impact)). Another side of the energy absorber element can be located on a stiffer support so as to be able to crush, e.g., located adjacent or attached to a base (such as a stiff base like the body in white (BIW) or other automotive component). Since the elements are designed to undergo elastoplastic deformation (and optionally only elastic deformation), they absorb energy upon impact, thereby reducing the damage to the pedestrian, occupant, and/or vehicle, accordingly. With elastoplastic deformation, which gets initiated after reaching the yield limit of the material, the energy will be absorbed through subsequent plastic deformation, thereby inhibiting the energy absorber element from regaining its original shape. The energy absorber elements can reduce maintenance cost of the vehicle after impact and/or reduce the mechanical and structural requirements of various vehicle components (e.g., if used with a headlamp, structural strength requirements of the component(s) supporting the headlamp assembly can be reduced). For example, energy absorber elements can reduce damage to the headlamp even in the case of bumper to bumper or bumper to any other foreign component impact. The energy absorber element can be detachable from the vehicle, thereby enabling facile replacement, for example, without requiring replacement of the entire vehicle component to which it is attached and/or which it is protecting.

The energy absorber element can be used in various locations within a vehicle. Possible locations include those which could be subjected to pedestrian impact and/or those which relate to occupant safety, as well as locations that could be subjected to other types of impact(s). Some components that can be subjected to pedestrian impact include the occupant head impact locations, fender, hood, fascia, front glass, grill, wiper, etc., while components that can be considered occupant safety related components include the steering wheel, seating system, instrument panel, roof, trim, door panel, pillar (e.g., A-pillar, B-pillar, C-pillar), floor rocker, cross-bar, glazing panel (e.g., where the glazing panel is secured to the vehicle (such as the roof)), knee bolster, etc. Other possible vehicle components and systems that can employ the energy absorber elements include, steering system (e.g., steering wheel, steering column, and so forth), lighting components (e.g., headlamp assemblies, rear (tail) lamp assemblies, fog lamp, indicator lights, etc.), glazing panel, and so forth, as well as combinations comprising at least one of the foregoing.

The energy absorber elements can be used in various geometries, e.g., open or closed, depending upon the desired location of the element, and can be located either internal (i.e., inside the respective assembly or integral to the component and still inside the component, e.g. energy absorber (EA) strips within an automotive seat) or external to the component (outside the component assembly, e.g. an EA strip in between a steering wheel and steering column). For example, a closed type of energy absorber element can be used if it is supporting the steering wheel, while in the case of fender or hood, an open energy absorber element can be employed. In some embodiments, the energy absorber element(s) can be located wherever contact between the component and its support is present, e.g. mounting locations of a fender with BIW. In other words, unlike bumper beam assemblies with energy absorbers in front of the bumper (e.g., only covered by a non-structural element such as a fascia), these energy absorber elements can be located between the component and its support to protect the component from damage.

Possible overall energy absorber geometries include strip, ring, polygonal, and so forth, as well as combinations comprising at least one of the forgoing. For example, the energy absorber element can comprise support walls (e.g., non-intersecting support walls, such as parallel support walls) with crush walls extending therebetween (e.g., having a geometry as illustrated in FIGS. 1-9, or a combination comprising at least one of those geometries). In various embodiments, the energy absorber element is open on more than one side (e.g., the support is closed on only two sides (for example, there are support walls on only two sides)).

The specific dimensions of the energy absorber element will be dependent upon its location in the vehicle and its function. For example, its length and width will be dependent upon the amount of space available in the desired location of use. The depth, "d", (e.g., the distance between the supporting walls) and wall thicknesses, will be dependent upon the available space, the desired stiffness, the location in the vehicle that the energy absorber element is employed, and the materials (or combination of materials) employed. In many embodiments, the depth "d" (e.g., the crushing depth), can be up to 500 mm, specifically, 10 millimeters (mm) to 300 mm, more specifically, 15 mm to 200 mm, and yet more specifically, 20 mm to 60 mm for some applications, 15 mm to 100 mm for other applications, and 80 mm to 200 mm for yet other applications. Exemplary applications and crush depths include, 20 mm to 45 mm for some headlamp applications, 20 mm to 45 mm for some roof applications, 20 mm to 60 mm for some hood applications, 15 mm to 100 mm for some seating applications, 20 mm to 120 mm for some fender applications, and 80 mm to 200 mm for some knee bolster applications.

The components of the energy absorber element can comprise any material(s) having the desired plastic deformation and crush characteristics for the particular application (e.g., location) of the element in the vehicle. Exemplary characteristics of the material include high toughness/ductility, thermal stability, high energy absorption capacity, a good modulus-to-elongation ratio, and recyclability, among others, wherein "high" and "good" are intended to mean that the characteristic at least meets vehicle safety regulations and requirements for the given component/element. Exemplary materials include acrylonitrile-butadiene-styrene (ABS); polycarbonate; polycarbonate/ABS blends; copolycarbonate-polyesters; acrylic-styrene-acrylonitrile (ASA); acrylonitrile-(ethylene-polypropylene diamine modified)-styrene (AES); phenylene ether resins; blends of polyphenylene ether/polyamide; polyamides; phenylene sulfide resins; polyvinyl chloride PVC; high impact polystyrene (HIPS); low/high density polyethylene (L/HDPE); polypropylene (PP); expanded polypropylene (EPP); and thermoplastic olefins (TPO). Other exemplary materials include composites, functionally graded materials, metals, and ceramics. The components can also be made from combinations comprising at least one of any of the above-described materials that meet the desired characteristics. In some embodiments, the energy absorber element comprises no metal. For example, the energy absorber element can be formed from a single plastic, a combination of plastic materials, or different plastics in different areas of the element (such as one type of plastic for the support walls and another type of plastic for the crush wall(s)). In various embodiments the energy absorber element is free of metal and/or free of ceramic.

The energy absorber element can be produced by several methods such as molding, forming, or any other suitable manufacturing technique. The energy absorber element can be made as a one-piece structure or as several components which are assembled together. For example, the crush wall(s) and support walls could be made separately then joined together by any suitable joining technique (e.g., adhesive (e.g., adhesive strip), bonding, fastener(s) (such as a bolt, screw, clamp, snap-connector, and so forth)). In some embodiments, the energy absorber element can be thermoformed as a single component.

A more complete understanding of the components, processes and apparatuses disclosed herein can be obtained by reference to the accompanying drawings. These figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

FIGS. 1-9 illustrate exemplary shapes for the energy absorber crush walls 2. As can be seen from the figures, the energy absorber element has a load side 6 that is contacted by the load before the support side 4 since the load moves in the loading direction (illustrated by an arrow). Some exemplary crush wall geometries are illustrated in the Figures. FIG. 1 illustrates sinusoidal, e.g., wherein between the support walls, each crush wall curves in at least two directions. FIG. 2 illustrates curved, wherein, between the support walls, each crush wall curves in only one direction. Here, the crush walls are illustrated as parallel to each other. FIG. 3 illustrates diagonal, wherein the crush walls extend straight from one support wall to the other support wall and meet the support walls at an angle other than perpendicular. In FIG. 3, the crush walls are illustrated as parallel to each other. FIG. 4 illustrates triangular, wherein the crush walls extend diagonally at different angles so as to form a triangular geometry between the support walls. FIG. 5 illustrates both bowed and hourglass geometries. Here, a pair of crush walls form a concave/convex arrangement wherein each crush wall curves in only one direction and the crush walls are not parallel to each other. FIG. 6 illustrates a rounded geometry with peaks and valleys; a sort of oscillating wave geometry. FIG. 7 illustrates a stepped geometry with an oscillating characteristic. FIG. 8 illustrates a honeycomb geometry. FIG. 9 illustrates tangential circles. Furthermore, in some embodiments, the crush walls extend from one support wall to another support wall without intersecting any other walls, ribs, or the like. In various embodiments, the crush walls can be smooth walls that extend between the load side and the support side. Optionally, additional transverse wall(s) (e.g., continuous or discontinuous wall located between the support walls and optionally parallel thereto) can be located between the support walls (e.g., see transverse wall 8 in FIG. 8). It is noted that each of these geometries can be employed alone or in combination with another geometry, e.g., a combination of two or more of the above geometries. Additionally, the crush walls can be parallel to each other (e.g., FIGS. 1-3) or nonparallel (e.g., FIGS. 4-7). Also, the distance between adjacent crush walls on the support side 4 can be less than or equal to the space between adjacent walls on the load side 6; e.g., the crush walls can converge or diverge toward the support side.

The load side and support side walls in the various embodiments FIG. 1 to FIG. 9 are shown parallel. However, load side and support side may not be parallel in various practical cases and the crush walls joining area with the load side and support side wall will modify suitably. It is noted that in various embodiment, even if the load side and support side walls are not parallel, they do not intersect. There is always a distance between these walls with crush wall(s) therebetween.

Crushable walls 2 deform in elastoplastic manner to absorb energy. In some embodiments, the crushable walls 2 deform in a fully elastic manner, or an elastoplastic manner, to absorb energy. The crushing of these walls can be designed in such a way that the deformation in the vehicle component comprising the energy absorber element is also reduced compared to such a system without the energy absorber element therein. The support wall 4 and load wall 6 can have multiple functions, e.g., to connect crushable walls ensuring integrity of the energy absorber element and/or to provide required reaction surface and load transfer to the crushable walls.

The support walls can be designed with a connection mechanism (e.g., snap fitting or any other alternative) so that energy absorber element can be attached to the vehicle. The energy absorber element can be attached to an adjacent component (e.g., the component to be protected during an impact and/or another adjacent component) and/or to the vehicle chassis. For example, the energy absorber element can be attached (e.g., directly, physically connected) to the support location for the vehicle component and/or to the vehicle component. The energy absorber element can be located between the vehicle component and a support for the vehicle component, e.g., with the load side adjacent the vehicle component and the support side adjacent the component support.

Referring to FIG. 10, a headlamp assembly 10 of a motor vehicle comprises a housing 20 enclosing internal components (such as the light source 22, lens 24, reflector 26, etc.). The housing 20 is connected to an energy absorber element (e.g., ring) 30 which is in turn connected to the chassis 40 of the motor vehicle, wherein the term "chassis" refers to any of multiple possible structures on which a headlamp may be mounted, (e.g., front end module (FEM), body in white (BIW), grill opening reinforcement (GOR), etc.); any one of these structures may be considered a chassis. In an impact, the energy absorber ring can absorb energy via plastic deformation up to a threshold value, at which point the energy absorber ring fails. Failure of the energy absorber ring causes the headlamp assembly to move into the chassis, transferring the remaining impact energy to the surrounding structure 50 (fascia, hood, grill, fender, etc.) for absorption. This avoids damage to the headlamp assembly, so that only replacement of the energy absorber ring is needed. The energy absorber ring 30 is shown as being near the front of the headlamp assembly 10, but can generally be located anywhere with respect to the headlamp assembly.

Figure 11:
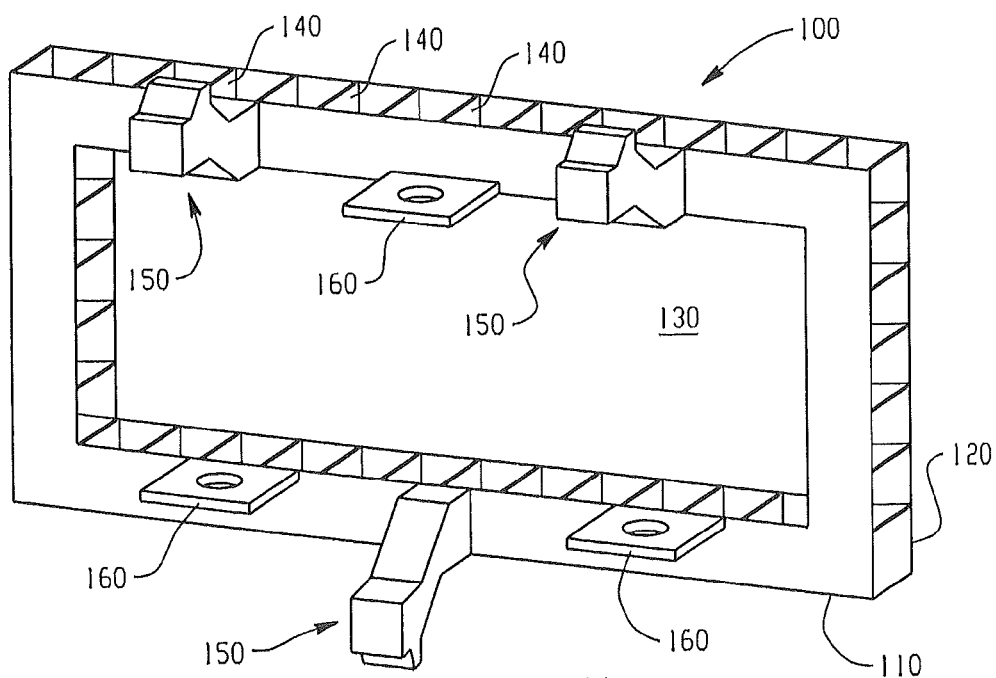
FIG. 11 is a perspective view of one exemplary embodiment of an energy absorber element.
Figure 12:
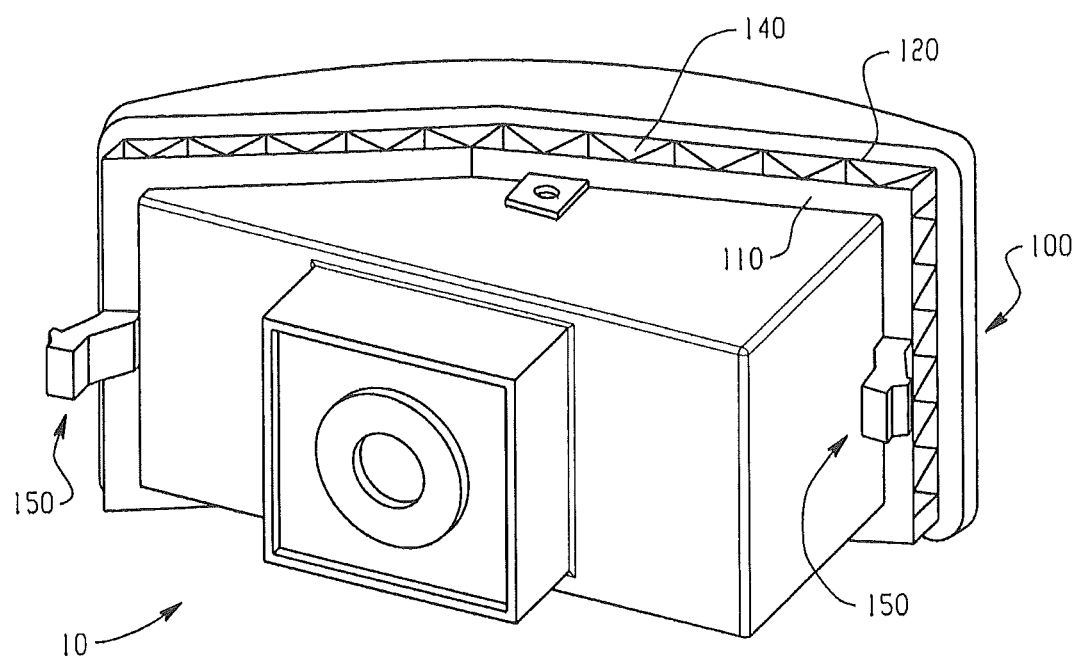
FIG. 12 is a perspective view of another exemplary embodiment of an energy absorber element (e.g., ring) surrounding a headlamp assembly.

FIG. 11 is a perspective view of an exemplary embodiment of an energy absorber ring 100. The energy absorber ring encloses or surrounds the headlamp assembly. The ring 100 comprises a first support wall 110 and a second support wall 120. Each support wall contains an opening 130 through which the headlamp assembly can be inserted. Generally, all of the headlamp assembly or only a portion of the headlamp assembly needs to be inserted through the opening. As seen in FIG. 10, some portions of the assembly, such as the lens 24, are not passed through the opening. Alternatively, at least one of the first support wall and second support wall may be considered as each having a ring shape, as being shaped to conform to the headlamp assembly, or as abutting the headlamp assembly. The opening is shown here as a rectangle; however, the opening can have any shape needed to support (e.g., surround) a headlamp assembly. The first and second support walls are shown here as being on opposite sides from each other. The first and second support walls may alternatively be substantially parallel to each other. The support walls themselves do not need to be a planar shape, but rather conform to the headlamp assembly as desired. For example, in FIG. 12, the support walls are slightly curved.

At least one crush wall 140 joins the first support wall and the second support wall together. The crush wall may be considered to define a deformable zone between the two support walls. The support walls provide integrity to the crush walls and deformable zones. The energy absorber ring also has a connection mechanism 150 for connecting one support wall to the chassis and/or a connection mechanism 160 for connecting one support wall to the associated headlamp assembly.

The energy absorber ring has at least one crush wall and may have a plurality of crush walls. When more than one crush wall is present, the crush walls may be identical or different from each other. The crush walls may also take different forms as long as they can absorb impact energy through deformation. For example, in FIG. 11, the crush walls have a planar form, while in FIG. 12 the crush walls have a corrugated form (e.g., triangular, also known as saw toothed). The crush walls can be tuned so that the energy absorber ring deforms as desired. For example, the threshold value at which the energy absorber ring fails can be changed by using different forms for the crush walls (e.g., different designs and/or different materials). The crush walls here are shown as having the same thickness; however, the thicknesses of the crush walls can also vary to change the way the energy absorber ring deforms. This could be used, for example, to control the path of the headlamp assembly as it travels into the chassis.

The connection mechanisms can take several different forms and/or can have different stiffness. They may be independently made integral to one or both support walls if desired. Alternatively, they can be independently made as a separate component which is then attached to the support wall, such as through a snap-fit mechanism. The snap-fit mechanism may be, for example, a torsional snap-fit mechanism or a cantilevered snap-fit mechanism, as shown for connection mechanism 150 in FIG. 11. The mechanism for connecting the support wall to the chassis and the mechanism for connecting the support wall to the headlamp assembly may, alternatively or also, be a connecting bracket that allows for attachment via male-female member engagement or by a fastener, such as a screw or bolt, as shown for connection mechanism 160 in FIG. 11. If desired, the mechanism for connecting could also be a bonding agent (e.g., glue or paste) as well. Another possible mechanism for connecting the support wall to the headlamp assembly would be by forming a valley around the headlamp assembly into which the energy absorber ring is placed. Generally, any connecting mechanism that can facilitate easy assembly and disassembly can be used.

Figure 13:
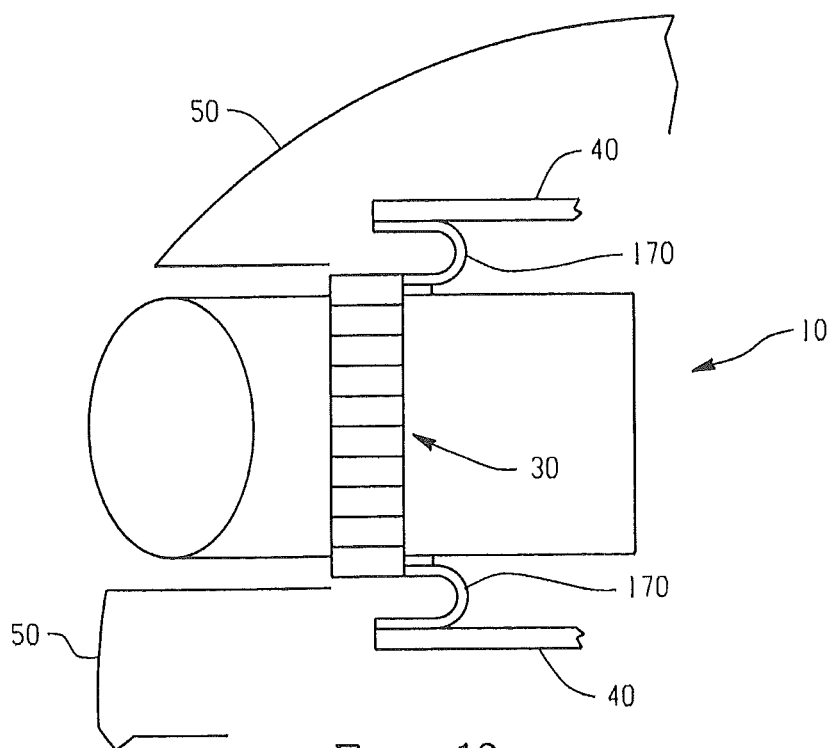
FIG. 13 is a side cross-sectional view of a headlamp assembly and another exemplary embodiment of an energy absorber element in the chassis of a motor vehicle.

The mechanism for connecting one support wall to the chassis and the mechanism for connecting one support wall to the headlamp assembly can also be designed to deform and absorb energy. They can fail either under tensile stress or compressive stress, depending on how they are formed or shaped. For example, the connecting brackets 170 in FIG. 10 will fail under compression, while the connecting brackets 170 in FIG. 13 will fail under tension.

The number of connecting mechanisms for connecting one support wall to the chassis and those for connecting one support wall to the headlamp assembly can vary as desired. Typically, there are at least two of each connection mechanisms to prevent possible rotation about an axis. In some specific embodiments, the energy absorber ring has three or more connecting mechanisms for connecting one support wall to the chassis.

The energy absorber ring, as shown, can be a continuous structure. However, if desired, the energy absorber ring can be formed as an assembly of many discrete units. Those discrete units can be the same or different and can connect to each other by various methods, such as snap-fit mechanisms or any other suitable connecting mechanism. Also, each discrete unit can be used as an independent/stand alone energy absorber element.

Figure 14:
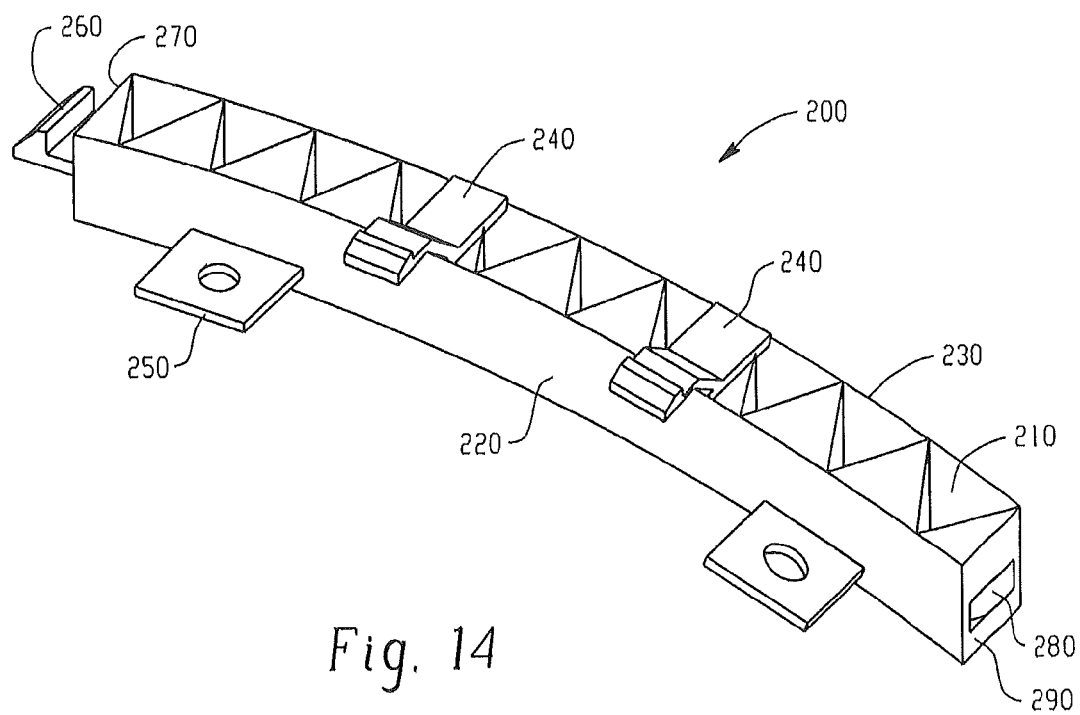
FIG. 14 is a perspective view of one exemplary embodiment of an energy absorber element.

FIG. 14 shows an exemplary embodiment of an energy absorber element 200 which can be used, if desired, as part of an assembly to form an energy absorbing ring. The element has at least one crush wall 210. The first support wall 220 and second support wall 230 connect to the crush wall(s) to form a structure. As shown here, the support walls are curved on one side. Again, there is a connection mechanism 240 for connecting the structure to the chassis and a connection mechanism 250 for connecting the structure to the headlamp assembly.

In some embodiments, the energy absorber element will further comprise a first connecting mechanism 260 at a first end 270 of the structure and a second connecting mechanism 280 at a second end 290 of the structure. The first and second connecting mechanisms should be complements to each other so that multiple energy absorber elements can be connected to form an assembly that makes an energy absorber ring. Exemplary complements include the cantilever portion and the recess portion of a cantilever snap-fit or two hermaphroditic connectors. This enables the energy absorber element to be connected with other discrete units to form an energy absorber ring.

Alternately, the energy absorber element can be used by itself to protect the headlamp assembly. For such uses, to prevent rotation, there will be a plurality of mechanism for connecting the structure to the chassis and/or a plurality of mechanism for connecting the structure to the headlamp assembly. For example, in FIG. 14, there are two snap-fit mechanisms 240 for connecting the structure to the chassis and connecting bracket(s) 250 (e.g., two connecting brackets) for connecting the structure to the headlamp assembly. Multiple energy absorber elements are then used as an intermediate, connecting the headlamp assembly to the chassis.

Figure 15:
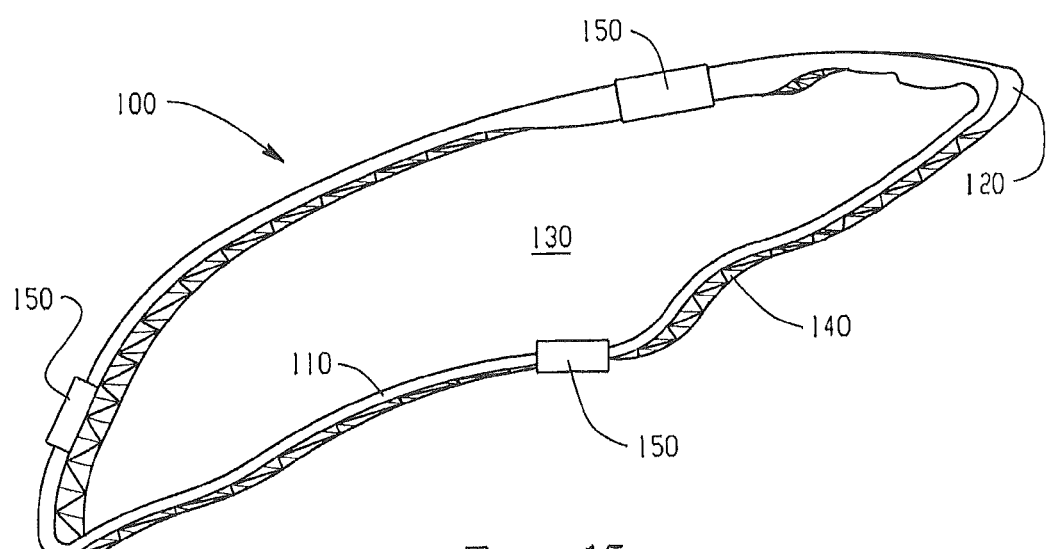
FIG. 15 is a perspective view of yet another exemplary embodiment of an energy absorber element.

FIG. 15 is another exemplary embodiment of an energy absorber ring. As seen here, the support walls can generally take any shape needed. Also, the crush walls may not fill up all of the space between the two support walls. Finally, the mechanism for connecting can be located anywhere along the support wall(s).

Figure 16:
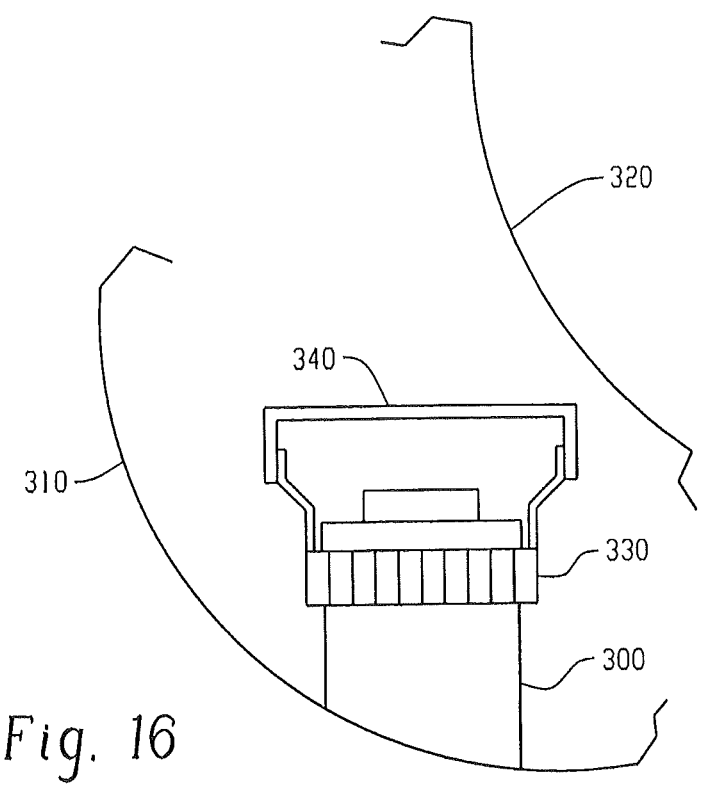
FIG. 16 is a top cross-sectional view of a headlamp assembly and an exemplary embodiment of an energy absorber element in the chassis of a motor vehicle.
Figure 17:
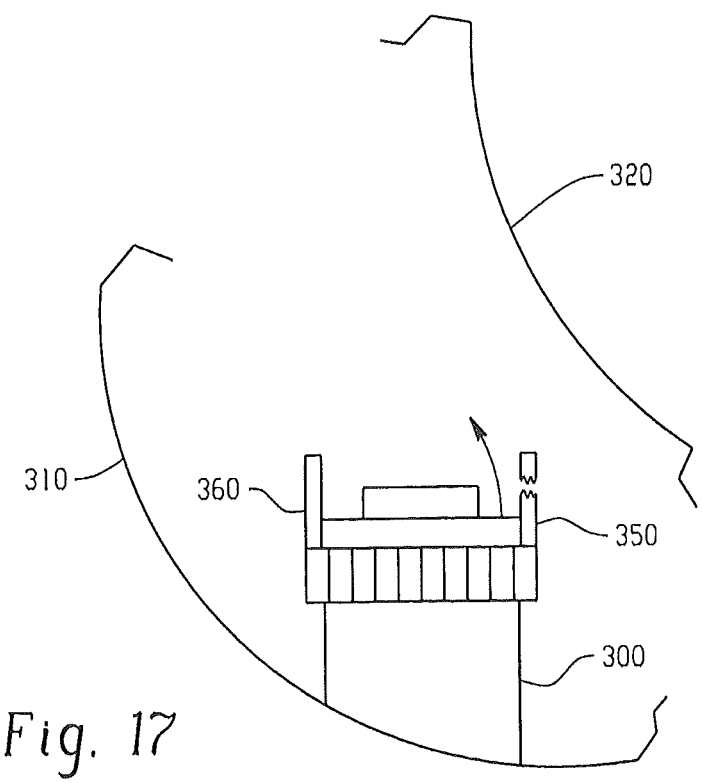
FIG. 17 is a top cross-sectional view of a headlamp assembly and an exemplary embodiment of an energy absorber element in the chassis of a motor vehicle.

FIG. 16 illustrates the functioning of the energy absorber ring when placed in a motor vehicle. As shown here, the headlamp assembly 300 forms part of the perimeter 310 of the vehicle. For reference, the hood 320 of the vehicle is also shown. Space in the engine compartment of a motor vehicle is typically at a premium and may contain other components as well that are even more expensive to replace than a headlamp assembly (e.g. electronics box, etc.). When the energy absorber ring 330 fails and the headlamp assembly 300 then moves into the engine compartment, it is generally desirable to control the path of the headlamp assembly. This can be done by, for example, placing a blocking wall 340 within the chassis so that the degree of intrusion of the headlamp assembly into the engine compartment is controlled and/or by providing variable stiffness to one of its connector. Alternatively, as seen in FIG. 17, the direction of movement of the headlamp assembly could be controlled by tuning the energy absorber ring so that one side 350 fails before the other side 360, allowing the headlamp assembly to twist and/or enter a different portion of the engine compartment or the adjoining space.

In another embodiment, energy absorber element(s) can be employed in an automotive steering system. The energy absorber element can be located in between the steering column and steering wheel (e.g., near to the hub area) and/or can be located at another appropriate location where it can get the desired packaging (crushing) space. The energy absorber element will deform during an impact and reduce the reaction force being experienced by an occupant's body or head.

Figure 19:
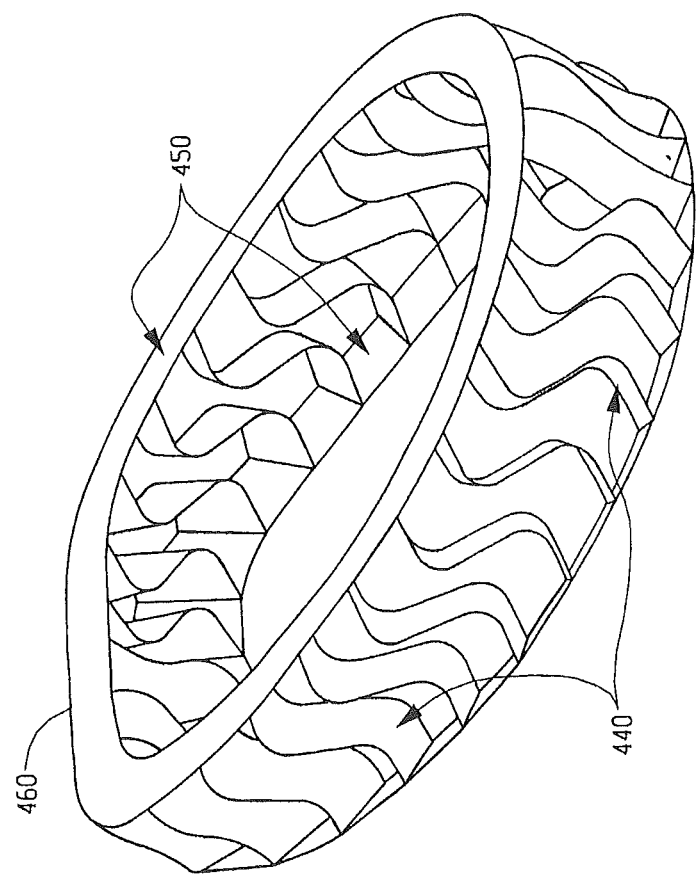
FIG. 19 is a prospective view of the energy absorber element of FIG. 18.
Figure 18:
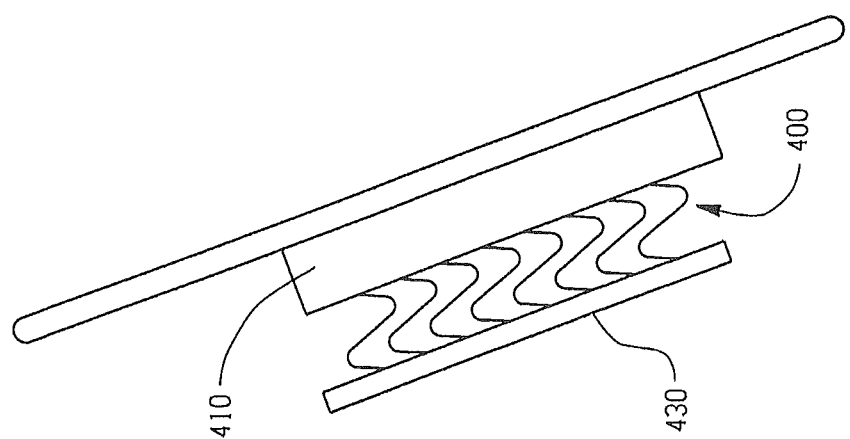
FIG. 18 is a partial, cross-sectional view of an embodiment of a steering wheel with an energy absorber element.
Figure 22:
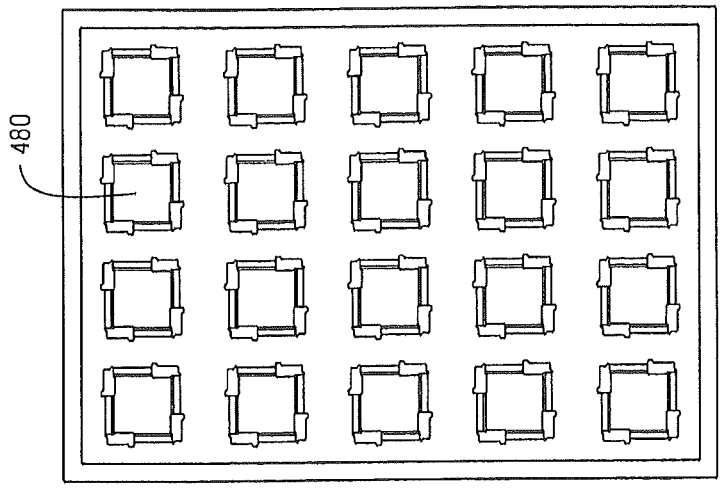
FIG. 22 is a frontal view of an exemplary embodiment of a seat back reaction face with energy absorber elements.
Figure 21:
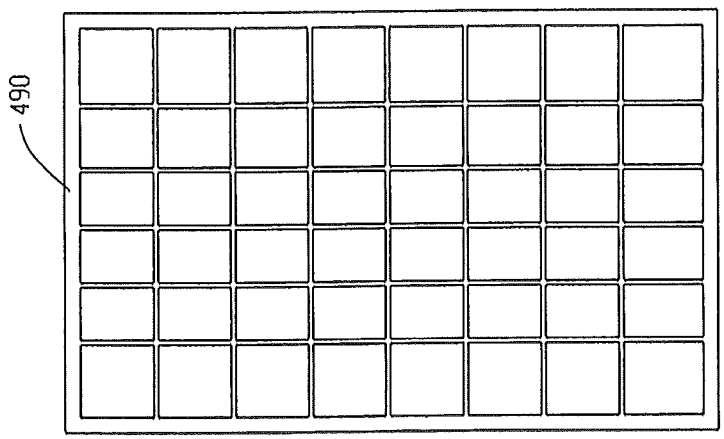
FIG. 21 is a frontal view of an exemplary design of a seat back reaction face without energy absorber elements.
Figure 20:
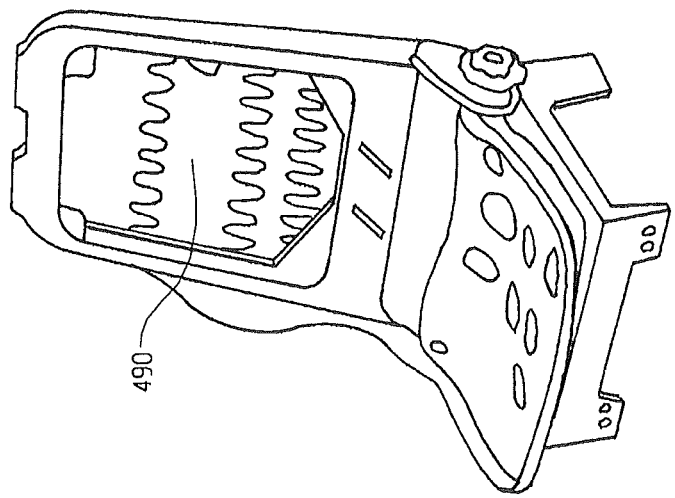
FIG. 20 is an exemplary view of a vehicle seat without the cushion or outer covering.

One such energy absorber element is being shown in FIGS. 18 and 19. The energy absorber elements have crushable walls 440, a support wall 450, and a load wall 460.

As is noted above, the energy absorber elements can be employed throughout the vehicle. Another exemplary embodiment is illustrated in FIGS. 20-24. An automotive seating system is subjected to various types of impact loads. In the case of front seats, they can experience occupant head impact and/or sled impact (impact load from behind), while the rear seat can be subjected to sled impact (goods kept in trunk) during a collision.

Energy absorber element(s) can be employed to absorb head and/or side impact energies. For example, energy absorber elements 480 (e.g., FIGS. 22-24) will be placed in between the foam layer and the seat back 490 of a seat (see FIG. 20). This can enable the energy absorber elements to get reaction surface from the skeleton (seat back reaction face in FIG. 21) of the seat. Cushioning (e.g., foam) and/or leather cover can be used to envelope the described system to generate feel and aesthetics.

Figure 25:
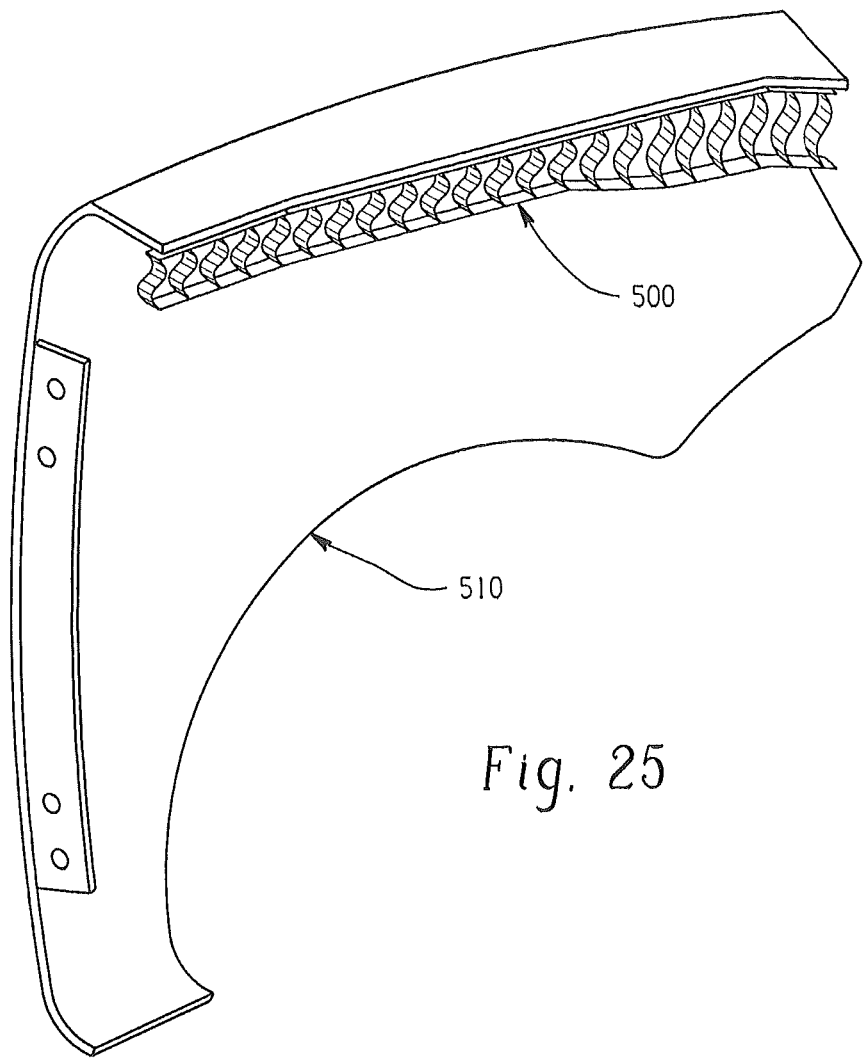
FIG. 25 is a cut away, perspective side view of an embodiment of a vehicle fender comprising energy absorber elements.
Figure 26:
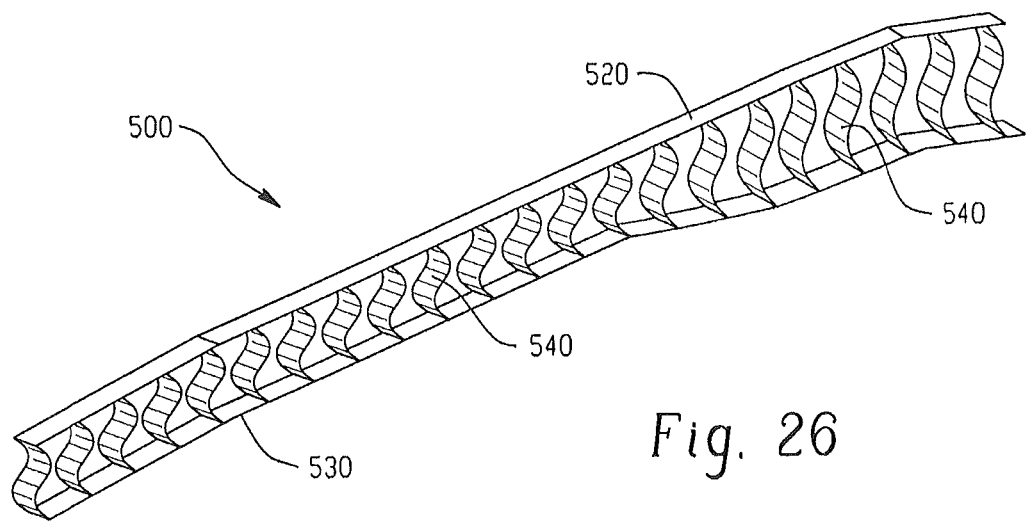
FIG. 26 is a perspective view of the energy absorber elements of FIG. 25.

In another embodiment, the energy absorber elements can be employed in conjunction with merely aesthetic components of the vehicle, such as the fender(s), hood, trunk, and/or other aesthetic elements which can be subjected to pedestrian head impact during a collision, as well as combinations comprising at least one of these elements, (e.g., excluding bumpers which are not merely aesthetic components). An exemplary assembled fender geometry is depicted in FIG. 25. As is illustrated, energy absorber element(s) 500 having a loading wall 520, support wall 530, and crush walls 540, can be used. The element 500 can be designed to deform during an impact before the fender deforms. Since the element is demountable, it can be replaced easily after impact without requiring the replacement of the entire fender. Here, the fender 510 need not be replaced for deformations in the energy absorber elements 500 because the energy absorber elements were designed to minimize the fender damage.

A vehicle hood can be subjected to child and adult head impact during a pedestrian impact. Here, energy absorber elements can be located, for example, between the hood and it's support location. The energy absorber elements would crush and absorb impact energy, thus decreasing head injury criteria (HIC) value during a head impact.

Figure 27:
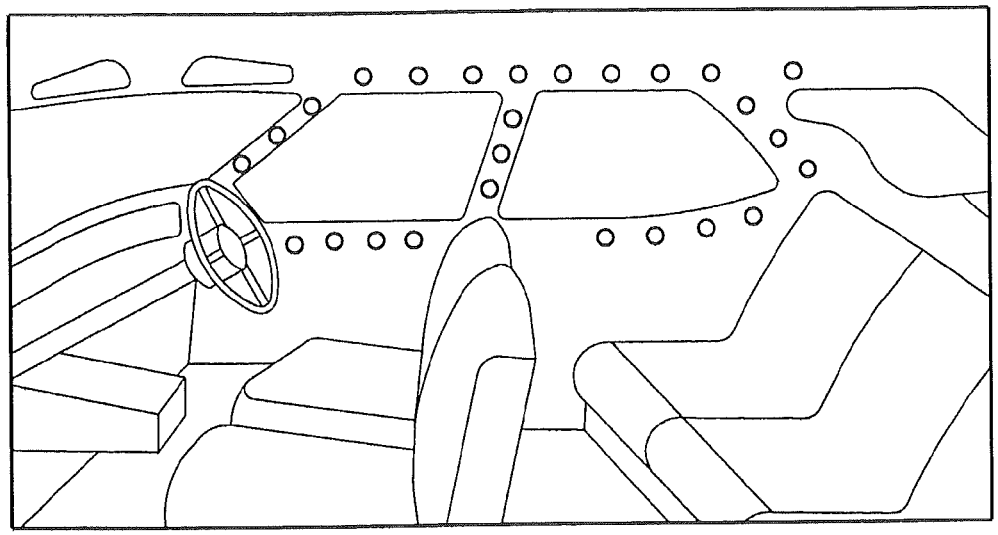
FIG. 27 is an exemplary illustration of an interior of a vehicle showing head impact locations for front seat occupant and rear seat occupants.
Figure 28:
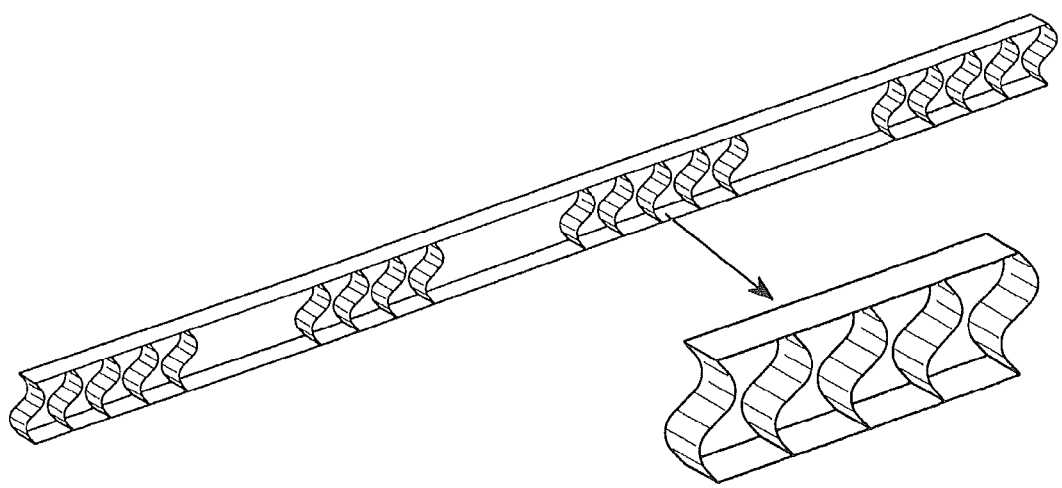
FIG. 28 is a perspective view of exemplary energy absorber elements that can be used in any of the head impact locations illustrated in FIG. 27.

Some other exemplary areas where the energy absorber elements can be employed are illustrated in FIG. 27. In this figure, occupant head impact locations for front seat occupant and rear seat occupants of a vehicle are illustrated with "●" marks. These marks are also possible locations for the energy absorber elements. For example, small, modular energy absorber elements (e.g., strips such as those illustrated in FIG. 28), can be placed at desired locations to provide softness and energy absorption capabilities. In some embodiments, energy absorber elements can be integrated with a headliner in order to reduce overall roof energy absorber elements.

Similar energy absorption strips can be designed for other automotive components as well. Other automotive components where this concept can be applied include knee bolster, side door, door handle, glazing panels, etc. It is further possible to retrofit these elements into existing vehicles and/or components.

There are numerous advantages of the current energy absorber elements, including that energy absorber element can be replaced after impact easily thus reducing the maintenance cost. These elements can be customized for the various areas of a vehicle, thereby enhancing the plastic and/or elastic energy absorption capability and reducing vehicle damage and/or reducing injury (e.g., to occupant(s) and/or pedestrian(s)).

These elements can be modular components that can be installed in any area of the vehicle where energy absorption is desired and sufficient space is available. In other words, the energy absorber element can be removably attached to the vehicle and can be configured to absorb energy before the vehicle component absorbs the energy so that, for example, the energy absorber element receives the damage in an accident, not the vehicle component. In such a case, only the energy absorber element would need replacement. Since it is removably attached to an area of the vehicle, the energy absorber element can be replaced instead of the entire vehicle component and energy absorber. This reduces repair costs and insurance costs.

The energy absorber elements can also be designed to be retrofit into existing vehicles. For examples, they can have a size and shape that enables them to be used in existing vehicles. In such design, an adhesive (e.g., strip or the like) or snap-fitting that grips the vehicle, can be used to secure (e.g., removably secure) the element to the vehicle. Similarly, the elements can be designed to attach together (e.g., the elements can comprise connector(s) for connecting to other elements, at the end of the element and/or along the support wall such that the elements could be arranged (and connected together) side by side, end to end, and/or on top of each other) such as in series or in parallel, so as to enable the degree of stiffness (e.g., the amount of energy absorption) to be tailored after the element has been produced and based upon the particular vehicle and the location on that vehicle where the elements will be used. For example, the body shop could utilize the same element for various vehicles and various locations in a vehicle by adjusting the number of elements.

The energy absorber elements are particularly useful in low energy impacts (e.g., pedestrian to vehicle exterior excluding bumper, occupant to vehicle interior, low speed (e.g., less than 15 kilometers per hour (kmph)) vehicle to vehicle, etc.). They can be located in many areas of the vehicle and can inhibit vehicle component damage and/or injury to the occupant/pedestrian, thereby reducing insurance costs and vehicle repair costs. These energy absorber elements, themselves (i.e., these single elements), can absorb energy from transverse and vertical loadings. The disclosed elements and method can reduce or eliminate damage to the impacted vehicle component and thereby reduce the need to replace that component. The energy absorber elements can absorb the impact (e.g., at low impact energies), and can be independently replaced, thereby reducing or eliminating vehicle component replacement requirements.

In some embodiments, an energy absorber element can comprise: a first support wall and a second support wall, a crush wall joining the first and second support walls together to define a deformable zone; a connection mechanism (e.g., demountable connection mechanism) configured to connect the first and/or second support wall to a vehicle (e.g., to the vehicle component and/or to the vehicle at a support location for the vehicle component). For example so as to protect a vehicle component and/or to absorb energy when a particular vehicle component is impacted.

In some embodiments, an energy absorber element can comprise: a crush wall defining a deformable zone; a first support wall and a second support wall, the first and second support walls connecting to the crush wall to form a structure; and a connection mechanism for connecting the structure to a vehicle (e.g., to the vehicle chassis, to the vehicle component (e.g., the component to be protected from impact energy), and/or to another vehicle component).

In some embodiments, an energy absorber ring for a headlamp assembly of a vehicle, can comprise: a first support wall defining a ring for surrounding the associated headlamp assembly; a crush wall extending from the first support wall to define a deformable zone; and connection mechanism configured to connect the ring to the vehicle.

In some embodiments, the energy absorber element for an associated headlamp assembly can comprise: a first support wall and a second support wall, each support wall containing an opening through which the headlamp assembly can be inserted; a plurality of crush walls joining the first and second support walls together to define a plurality of deformable zones and form a ring; and crushable connectors for connecting the ring to the vehicle. In one embodiment, a method for using an energy absorber element with a vehicle component can comprise: detachably connecting an energy absorber element to a vehicle.

In one embodiment, a method for absorbing impact energy in a vehicle comprises: impacting a vehicle component with impact energy; and absorbing the impact energy with an energy absorber element that is detachably mounted to the vehicle. In some embodiments, the vehicle component is not replaced, e.g., is undamaged after the impact. For example, the energy absorber element is a separate modular part that is used between a vehicle component and a support in a vehicle. After an impact (e.g., an impact of sufficient energy that, but for the absorption of the energy absorber element, the vehicle component impacted would have been damaged), the energy absorber element is replaced; it is not reusable.

In the various embodiments, (i) the first and second support walls can be substantially parallel to each other; (ii) the first and second support walls can be on opposite sides of the a crush wall; (iii) the crush wall can have a corrugated form; (iv) the connection mechanism can be a snap-fit mechanism; (v) the connection mechanism can be a crushable connector; (vi) the first and second support walls can connect to each crush wall to form a structure, and, optionally, the structure can have a ring shape; (vii) the energy absorber element is modular; (viii) the energy absorber element can be readily removed from the vehicle component (e.g., and replaced); (ix) the connection mechanism can removably attach to the vehicle component (e.g., the energy absorber element is not formed as an integral, unitary part of the vehicle component; it can be replaced separately of the vehicle component); (x) upon impact, the energy absorber element undergoes elastoplastic deformation; (xi) upon impact, the energy absorber element undergoes elastic deformation (e.g., solely elastic deformation); (xii) the energy absorber element provides passive energy absorption; (xiii) the energy absorber element can be removably connected to the vehicle chassis, the support location for the vehicle component, and/or to the vehicle component (e.g., such that the energy absorber element can be independently replaced without replacing the vehicle component); (xiv) wherein the energy absorber element is located between the vehicle chassis and the vehicle component; (xv) the vehicle component can be selected from the group consisting of an occupant head impact location, fender, hood, front glass, grill, wiper, seating system, instrument panel, roof, door (e.g., door panel, door handle), A-pillar, B-pillar, C-pillar, glazing panel, knee bolster, steering system, lighting components, and combinations comprising at least one of the foregoing; (xvi) the vehicle component excludes bumpers; and/or (xvii) the method can further comprise detaching the energy absorber element from the vehicle; and separately replacing the energy absorber element from the vehicle component. The various embodiments can optionally further comprise a first connecting mechanism at a first end of the structure; and a second connecting mechanism at a second end of the structure, wherein the first and second connecting mechanisms are complements to each other (e.g., are mateable).

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to d one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. An energy absorber element for a vehicle component, comprising:
    a first support wall and a second support wall, wherein the first support wall forms a ring, and wherein the second support wall forms a ring;
    a plurality of crush walls joining the first and second support walls together to define a deformable zone; and
    a demountable connection mechanism configured to detachably connect the first and/or second support wall to a vehicle component, and wherein the vehicle component comprises at least one of a front glass component and a glazing panel; and
    wherein the first support wall, the second support wall, and the crush walls comprise plastic.

2. The energy absorber element of claim 1, wherein the vehicle component comprises a front glass component.

3. The energy absorber element of claim 1, wherein the vehicle component comprises a glazing panel.

4. The energy absorber element of claim 1, wherein the first and second support walls do not intersect.

5. The energy absorber element of claim 1, wherein at least one of the crush walls is configured to both elastically deform and elastoplastically deform.

6. The energy absorber element of claim 1, wherein at least one of the crush walls has a geometry selected from the group comprising: corrugated form, sinusoidal, triangular, bowed, hourglass, rounded with peaks and valleys, stepped, honeycomb, tangential circles, and combinations comprising at least one of the foregoing geometries.

7. The energy absorber element of claim 1, wherein the connection mechanism is a snap-fit mechanism.

8. The energy absorber element of claim 1, wherein the connection mechanism is a crushable connector.

9. An energy absorber element for a vehicle component, comprising:
    a first support wall and a second support wall, wherein at least one of the first support wall and the second support wall is configured to connect to a vehicle component, and wherein the vehicle component comprises at least one of a front glass component and a glazing panel;
    a plurality of crush walls joining the first and second support walls together to define a deformable zone; and
    wherein the crush walls are configured to both elastically deform and elastoplastically deform from the second support wall toward the first support wall;
    wherein the crush walls are configured to absorb energy during an impact;
    wherein the first support wall, the second support wall, and the crush walls comprise plastic; and
    wherein the first support wall forms a ring, and wherein the second support wall forms a ring.

10. The energy absorber element of claim 9, wherein the vehicle component comprises a front glass component.

11. The energy absorber element of claim 9, wherein the vehicle component comprises a glazing panel.

12. The energy absorber element of claim 9, wherein the first and second support walls do not intersect.

13. A method for using an energy absorber element with a vehicle component, comprising:
    detachably connecting an energy absorber element to the vehicle component with a connection mechanism, wherein the vehicle component comprises at least one of a front glass component and a glazing panel, and wherein the energy absorber element comprises
    a first support wall and a second support wall; and
    a plurality of crush walls joining the first and second support walls together to define a deformable zone;
    wherein the first support wall, the second support wall, and the crush walls comprise plastic.

14. The method of claim 13, wherein once the energy absorber element has absorbed energy, detaching the energy absorber element from the vehicle component; and separately replacing the energy absorber element from the vehicle component; and wherein the vehicle component is not replaced.

15. The method of claim 13, wherein the vehicle component comprises a front glass component.

16. The method of claim 13, wherein at least one of the crush walls is configured to both elastically deform and elastoplastically deform.

17. The method of claim 13, wherein at least one of the crush walls has a geometry selected from the group comprising: corrugated form, sinusoidal, triangular, bowed, hourglass, rounded with peaks and valleys, stepped, honeycomb, tangential circles, and combinations comprising at least one of the foregoing geometries.

18. The method of claim 13, wherein the connection mechanism is a snap-fit mechanism.

\* \* \* \* \*